United States Patent
Huber et al.

(10) Patent No.: US 7,144,023 B2
(45) Date of Patent: Dec. 5, 2006

(54) STABILIZING STRUT, IN PARTICULAR FOR A CHASSIS OF A VEHICLE, AND METHOD FOR THE PRODUCTION THEREOF

(75) Inventors: Konrad Huber, Oberkirch (DE); Hans Merkle, Endingen (DE); Hansjoerg Schmieder, Oberkirch-Zusenhofen (DE)

(73) Assignee: Progress-Werk Oberkirch AG, Oberkirch (DE)

( * ) Notice: Subject to any disclaimer, the term of this patent is extended or adjusted under 35 U.S.C. 154(b) by 0 days.

(21) Appl. No.: 10/929,031

(22) Filed: Aug. 27, 2004

(65) Prior Publication Data

US 2005/0023791 A1 Feb. 3, 2005

Related U.S. Application Data

(60) Division of application No. 10/256,350, filed on Sep. 27, 2002, now Pat. No. 6,789,811, which is a continuation of application No. PCT/EP01/03382, filed on Mar. 24, 2001.

(30) Foreign Application Priority Data

Mar. 27, 2000 (DE) ................. 100 14 581

(51) Int. Cl.
*B60G 3/12* (2006.01)
(52) U.S. Cl. .............................. 280/124.133
(58) Field of Classification Search ......... 280/124.107, 280/124.117, 124.128, 124.133, 124.134, 280/124.137, 124.148, 124.149, 124.152, 280/124.156
See application file for complete search history.

(56) References Cited

U.S. PATENT DOCUMENTS 4,556,234 A * 12/1985 Mahnig et al. ....... 280/124.134
4,570,968 A    2/1986  Mukai et al.
5,236,209 A    8/1993  Lopiccolo
5,310,211 A    5/1994  DelBeke
5,597,175 A    1/1997  Tuan
5,649,719 A    7/1997  Wallace et al.
5,855,394 A    1/1999  Horton et al.
6,010,155 A    1/2000  Rinehart
6,019,383 A    2/2000  Kociba et al.
6,460,869 B1  10/2002  Tremouilles

FOREIGN PATENT DOCUMENTS

DE   35 24 346 A1    1/1987
DE   91 16 634.9     6/1993
DE   42 02 056 A1    7/1993
DE   195 25 347 C1   7/1995
DE   196 43 299 A1   5/1997
DE   100 14 581 C2  10/2001
GB   2 165 912 A     4/1986

\* cited by examiner

*Primary Examiner*—David R. Dunn
(74) *Attorney, Agent, or Firm*—Harness, Dickey & Pierce, P.L.C.

(57) ABSTRACT

A stabilizing strut, in particular for a chassis of a vehicle, in particular a Watt strut, is described, said strut having an elongate strut body which is designed as a profile. The strut body is formed as a profile which is open on one side at least in some sections along its longitudinal direction and the two longitudinal edges of which are connected integrally to each other at least in some sections axially to give a closed profile. Furthermore, a method for producing a stabilizing strut of this type is described.

10 Claims, 3 Drawing Sheets

STABILIZING STRUT, IN PARTICULAR FOR A CHASSIS OF A VEHICLE, AND METHOD FOR THE PRODUCTION THEREOF

CROSS REFERENCE TO PENDING APPLICATION

This present application is a divisional of U.S. application Ser. No. 10/256,350, filed Sep. 27. 2002 now U.S. Pat. No. 6,789,811, which is a continuation of international patent application PCT/EP01/03382 filed on Mar. 24, 2001 which designates the United States, and which claims priority of German patent application 100 14 581.7 filed on Mar. 27, 2000.

BACKGROUND OF THE INVENTION

The invention relates to a stabilizing strut, in particular for a chassis of a vehicle, in particular a Watt strut, having an elongate strut body which is designed as a profile.

The invention relates furthermore to a method for producing a stabilizing strut of this type, a strut body being formed from a sheet-like blank to give a profile.

A stabilizing strut of this type and a method for the production thereof are known in general through their use or application.

A special stabilizing strut which is used in many chassis of vehicles is the Watt strut. The Watt strut is part of the Watt linkage which is used primarily in vehicles having a rigid axle, in order to reduce lateral movements of the rigid axle. In the case of the Watt linkage, a lever, which is mounted rotatably in the center, is mounted, for example, on the differential and is guided to both sides by a respective stabilizing strut or Watt strut which is identical in length and is fastened to the vehicle body. This coupling means that only an exact, vertical movement of the guided lever is possible.

However, the invention is not restricted to a Watt strut.

The stabilizing struts known to date have an elongate strut body which is designed as a profile.

The strut body of the known stabilizing struts is designed as a single part in the longitudinal direction of the strut body. In the circumferential direction, the strut body of the known stabilizing struts is designed as two parts. The profile of the known stabilizing struts is, as a rule, a circumferentially closed box profile, having a base section which is formed in a U-shape in cross section, the open side of the U being closed by a cover plate which extends over the entire length of the strut body. A profile of this type, which is closed on all sides, ensures the flexural rigidity required for a stabilizing strut of this type. Other known designs of stabilizing struts are pipes which are continuously and circumferentially closed.

A disadvantage of the known stabilizing struts is that they have a high weight because of the design described above, and, since the cover plate has to be welded or soldered to the base profile over the entire axial length, the production method is also time-consuming and costly in terms of material and is consequently expensive. A further disadvantage is that surface engineering cannot be used properly in the interior of the stabilizing strut. For example, the inside of the closed profile cannot be coated and so there is an increased risk of corrosion.

The invention is therefore based on the object of developing a stabilizing strut, and a method for the production thereof, of the type mentioned at the outset to the effect that the stabilizing strut is lower in weight in spite of the flexural rigidity being ensured, the production method can be carried out at less expense, and surface engineering can readily be used on the inside.

SUMMARY OF THE INVENTION

With regard to the stabilizing strut mentioned at the outset, this object is achieved in that the strut body is formed as a profile which, in cross section, is open on one side at least in some sections along its longitudinal direction and the two longitudinal edges of which are connected integrally to each other at least in some axial sections to give a closed profile.

In the case of the method, the object underlying the invention is achieved according to the invention in that the strut body is initially formed to give a profile which, in cross section, is open on one side, and the longitudinal edges of which are connected integrally to each other at least in some axial sections to give a closed profile.

The stabilizing strut according to the invention breaks away from the concept of the known stabilizing struts—of forming a box profile which is closed continuously axially and has a bottom part and a separate covering part or as a pipe. Instead, the stabilizing strut according to the invention is produced by forming a profile which is open on one side and is circumferentially closed in some axial sections and therefore in axially limited portions only. In contrast to the known stabilizing struts, in which the base box profile is closed by a separate covering plate, so that the strut body of the known stabilizing struts consists of a number of parts in the circumferential direction, in the case of the stabilizing strut according to the invention, the closed sections of the strut body are in the manner of a single part in the circumferential direction by the two longitudinal edges being connected integrally in these regions to give the closed profile. The stabilizing strut according to the invention is therefore, first, low in weight, but the design as a profile which is closed in some sections axially is simultaneously flexurally rigid. The production method according to the invention is less time-consuming, is material-saving and therefore cost-effective, and the inside of the profile can readily be treated at any time.

In a preferred refinement of the stabilizing strut, the longitudinal edges are connected by means of at least one link which extends in part axially in the longitudinal direction of the strut body and is formed integrally onto at least one of the longitudinal edges.

This measure constitutes a particularly favorable possibility in terms of production of connecting the two longitudinal edges integrally to each other in some axial sections to give a closed profile. The at least one link, preferably the plurality of links distributed in the longitudinal direction of the stabilizing strut, contributes to increasing the flexural rigidity of the stabilizing strut according to the invention, and, nevertheless, weight is saved by limiting the links axially.

Within the scope of this refinement, a respective link can advantageously be formed onto the two longitudinal edges, with the result that the two links lie opposite each other and are connected to each other between the longitudinal edges. However, the link may also be formed integrally onto the one longitudinal edge, protrude as far as the opposite longitudinal edge and be connected to the latter, with the result that in the overlapping region of the link with the opposite longitudinal edge a classical fillet weld joint can advantageously be used.

In a further preferred refinement, the at least one link runs transversely or obliquely to the longitudinal direction of the strut body in the manner of a web.

It is furthermore preferred if there are at least two links which form a V with one another.

This arrangement of the links enables the flexural rigidity of the stabilizing strut to be improved even further because tensile or compressive loads acting in different directions can be better absorbed by the V-shaped arrangement of the links. In this connection, a plurality of links in the form of a number of Vs may form a zigzag arrangement.

According to a further preferred refinement, the at least one link may also be of curved design, the link being formed on at two axially spaced-apart points on the same longitudinal edge of the strut body.

Within the context of the present invention, in addition to the previously mentioned exemplary refinements, further refinements for the one or more links can be taken into consideration, which refinements correspondingly contribute to increasing the flexural rigidity of the stabilizing strut.

The connection of the longitudinal edges of the strut body by means of at least one link is particularly advantageous if the strut body is produced as a punched part, the at least one link being formed by the punching process, by material being left on one of the longitudinal edges.

In the case of the method according to the invention, to this end the sheet-like blank is manufactured as a punched part onto which at least one link is formed during the punching process, by material being left, the link being used to connect the longitudinal edges of the strut body to each other after the forming process to give the profile.

These measures enable the stabilizing strut according to the invention to be produced with just a few manufacturing steps, namely punching, forming to give the profile, if appropriate bending of the at least one link and connecting of the two longitudinal edges of the strut body via the at least one link. Any known method, for example welding, soldering or bonding, may be used as connecting techniques.

In a further preferred refinement, the strut body is formed, at least in some axial sections, essentially as a U-profile which is closed in some axial sections by connecting the longitudinal edges.

This produces a box profile which is closed axially only in some sections and which has a particularly high flexural rigidity.

In a particularly simple refinement of the stabilizing strut according to the invention, the strut body is formed, at least in some axial sections, essentially as a profile which is triangular in cross section and is closed at the longitudinal edges by direct connection of the longitudinal edges. In open regions, the profile can then, for example, be U-shaped in cross section.

In this refinement, a stabilizing strut which is advantageously particularly low in weight and can be produced particularly cost-effectively is produced, which strut can be manufactured from a simple, rectangular, sheet-like blank by a single forming process with subsequent, sectional or continuous joining of the longitudinal edges.

In a further preferred refinement, the strut body differs in cross section with regard to shape and/or cross-sectional size in the longitudinal direction.

By means of cross-sectional changes of this type, for example expansions of the cross section at various points of the strut body, the flexural rigidity can be further increased. Also, for example in conjunction with the previously mentioned refinements, the strut body may in some sections have a U-shaped profile and in some sections a profile which is triangular in cross section, by means of direct connection of the longitudinal edges.

In a further preferred refinement of the stabilizing strut according to the invention, a respective bearing bushing is arranged at the longitudinal ends of the strut body.

If the bearing bushings are formed integrally, the entire stabilizing strut can be manufactured in a particularly simple manner as a single part from a blank by punching, forming and joining. However, the bearing bushings may also be subsequently joined on separately in the form of pieces of pipe, for example by welding.

In a further preferred refinement, the strut body is composed in the longitudinal direction from at least two profile parts which are arranged partially overlapping one another in the longitudinal direction and are connected to one another in the overlapping region.

In this case, although a multi-part design is accepted in the longitudinal direction of the strut body, said design has the advantage that bearing bushings arranged at the longitudinal ends of the assembled strut body can have bearing axes which are not parallel to one another. This may be advantageous for structural reasons of the chassis, into which the stabilizing strut is to be fitted, because the predetermined, spatial conditions can be better used in this manner. This cannot easily be achieved with the conventional designs mentioned at the beginning. The multi-part design of the strut body in the axial direction enables the individual profile parts to be joined to one another with an angular offset, as a result of which a non-rectilinear stabilizing strut can thereby be produced.

In this case, the profile parts may be joined, with their respective open side pointing in the same direction; it is likewise preferred if the profile parts are joined, with their respective opening side pointing in the opposite direction, to give the strut body.

In the case of the latter refinement, a profile which is circumferentially closed is produced in the overlapping region of the profile parts, as a result of which the flexural rigidity can be increased even further.

Further advantages and features arise from the following description and the attached drawing.

It goes without saying that the features mentioned above and those which are yet to be explained below can be used not only in the respectively indicated combination, but also in other combinations or on their own, without departing from the scope of the present invention.

BRIEF DESCRIPTION OF THE DRAWINGS

Exemplary embodiments of the invention are illustrated in the drawing and will be described in greater detail below with reference thereto. In these drawings.

DETAILED DESCRIPTION OF PREFERRED EMBODIMENTS

Figures 1, 2:
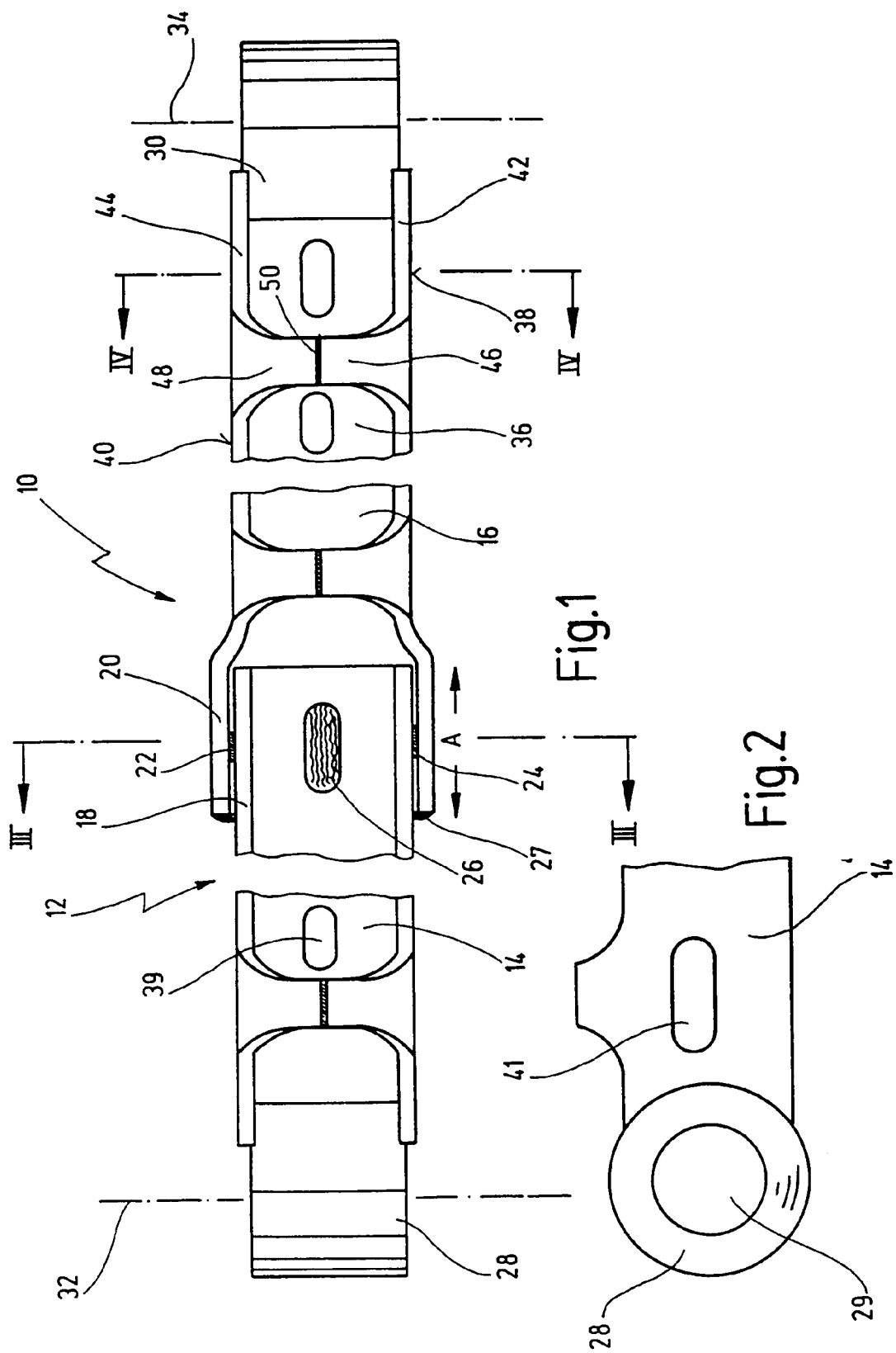
FIG. 1 shows an interrupted overall illustration of a stabilizing strut in plan view.
FIG. 2 shows a detail of the stabilizing strut in FIG. 1 in side view.

In FIGS. 1 through 4, a stabilizing strut provided with the general reference number 10 is illustrated. The stabilizing strut 10 is used as a Watt strut in a chassis of a vehicle.

The stabilizing strut 10 has an elongate strut body 12 which is designed as a profile.

The strut body 12 is joined in the longitudinal direction of the strut body 12 from at least two profile parts 14 and 16 which are arranged partially overlapping one another in the longitudinal direction of the strut body 12, in an overlapping region referred to by A, and are connected to one another. For this purpose, an axial end section 18 of the first profile part 14 is inserted into an axial end section 20 of the second profile part 16. The axial end section 20 of the second profile part 16 is correspondingly formed with a widened cross section. Conversely, the axial end section 18 of the first profile part 14 could, however, also be formed with a cross section which is reduced in comparison with the rest of the profile part 14.

Figure 3:
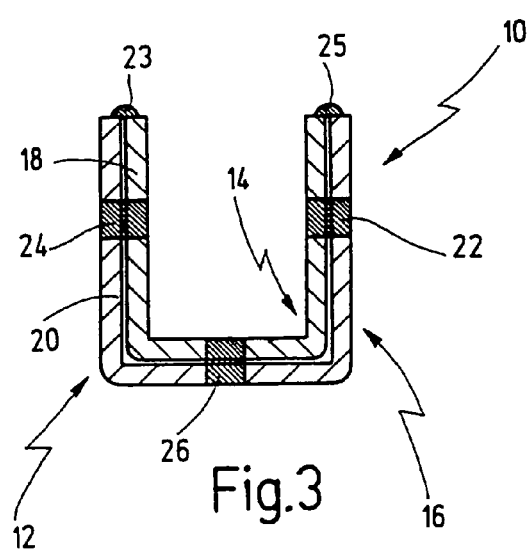
FIG. 3 shows a section along the line III—III in FIG. 1.

The axial end section 18 and the axial end section 20 are connected to each other with a cohesive material joint via plug welds 22, 24 or via flanged edge welds 23 and 25 and via a plug weld 26 and via a fillet weld 27 (cf. also FIG. 3).

While, in FIG. 1, the profile parts 14 and 16 are arranged in a rectilinear orientation with respect to each other in the longitudinal direction of the strut body 12, the profile parts 14 and 16, owing to the multi-part design in the longitudinal direction, may also be joined to each other with an angular offset, with the result that in such a case, the strut body 12 does not assume a rectilinear profile, but a bent profile.

At the end lying opposite the axial end section 18 the first profile part 14 has a bearing bushing 28 with a bearing opening 29. Correspondingly, the second profile part 16 has a bearing bushing 30 with a corresponding bearing opening (not illustrated) at its end lying opposite the axial end section 20.

The bearing bushings 28 and 30 can be formed integrally onto the profile part 14 and 16, respectively, or can be welded on as pieces of pipe or as punched parts.

In the exemplary embodiment shown, bearing axes 32 and 34, which are drawn in in FIG. 1, run parallel to each other, but, owing to the multi-part design of the strut body 12 in the longitudinal direction, as described above, because of a corresponding angular offset of the profile parts 16 and 14 with respect to each other, the bearing axes 32 and 34 may also not run parallel to each other, if a stabilizing strut of this type is desired because of structural conditions of the vehicle, it also being possible to achieve this with a rectilinear orientation of the profile parts 14 and 16, if the bearing bushings 28 and 30 are not formed onto the strut body 12 at right angles thereto.

However, the invention is not restricted to a multi-part design of the stabilizing strut 10 in the longitudinal direction of the strut body 12; rather, the stabilizing strut 10 may also be designed as a single piece or integrally in the longitudinal direction.

The strut body 12 is formed in cross section as a profile which is open on one side at least in some axial sections along its longitudinal direction. As is revealed in FIGS. 3 and 4, the strut body 12 is shaped essentially as a U-profile which has a base section 36 and two wall sections 38 and 40 running transversely thereto. As illustrated in FIGS. 1 and 2, punched holes 39 and 41 are formed in the base section and in the wall sections 38 and 40, as a result of which a further reduction in weight is achieved, but the flexural rigidity is not impaired.

In contrast to FIG. 1, the profile may also have different cross-sectional shapes and different cross-sectional sizes, as seen in the longitudinal direction, for example expansions or taperings. The flexural rigidity can thereby be further improved by expansions or pulled-in areas.

The strut body 12 is open on one side in some axial sections in cross section, i.e. in the circumferential direction, longitudinal edges 42 and 44 of the strut body 12, which constitute free ends of the wall sections 38 and 40, being connected integrally to each other in some axial sections to give a closed profile. The longitudinal edges 42 and 44 are designated for the profile part 16 by way of example, it being understood as self-evident that the profile part 14 also has longitudinal edges of this type.

The profile parts 14 and 16 are in each case designed as a single part. The integral connection of the longitudinal edges 42 and 44 is realized by at least one link, and in the exemplary embodiment shown by a plurality of links 46 which are formed integrally onto at least one of the longitudinal edges 42 or 44.

In the exemplary embodiment shown according to FIGS. 1 to 4, a link 46 is formed integrally onto the longitudinal edge 42 and a link 48 onto the longitudinal edge 44, the links 46 and 48 lying opposite each other and being joined between the longitudinal edges 42 and 44 via a weld 50 or a soldered seam or via another connecting method.

A plurality of such pairs of links 46 and 48 are distributed in the longitudinal direction of the strut body 12, with the result that the strut body 12 constitutes a closed profile in the regions in which the links 46 and 48 are present.

In this case, the pairs of links 46 and 48 form webs running transversely to the longitudinal direction of the strut body 12.

However, webs of this type may also run obliquely to the longitudinal direction of the strut body 12, as will be described later on with reference to another exemplary embodiment.

Figure 4:
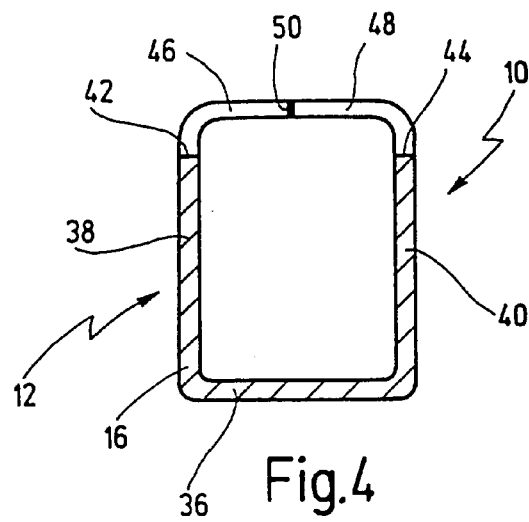
FIG. 4 shows a section along the line IV—IV in FIG. 1.
Figure 4A:
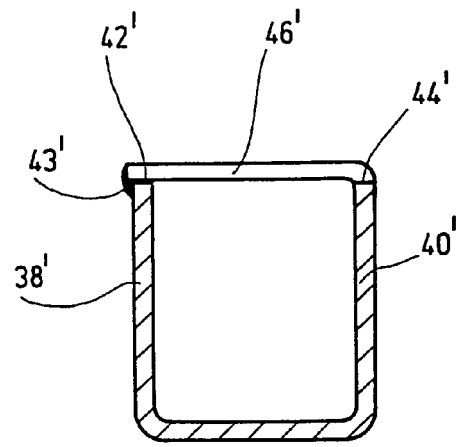
FIG. 4a shows a sectional illustration comparable to FIG. 4, according to an exemplary embodiment modified in comparison with FIG. 1.

FIG. 4a illustrates an exemplary embodiment which is slightly modified in comparison with FIGS. 1 to 4, in which the at least one link 46' is formed integrally onto the longitudinal edge 44' of the wall section 40' while the free end of the link 46' is welded to the opposite longitudinal edge 42' via a fillet weld 43'. For this purpose, the free end of the link 46' protrudes laterally slightly over the longitudinal edge 42', as a result of which the fillet weld 43' can easily be put into place.

The first profile part 14 and the second profile part 16 are produced in each case as punched parts, the links 46 and 48 being left on the longitudinal edges 42 and 44, respectively, by the punching process, when punching out from a sheet-like blank.

In the case of an overall single-part design of the strut body 12, the latter can therefore be produced cost-effectively with little expenditure of time from a single, sheet-like blank by punching, forming to give the profile and connecting the links 46 and 48 with a cohesive material joint.

Similarly, the bearing bushings 28 and 30 may, as already mentioned, be connected integrally to the strut body 12 during the above-described punching process from the sheet-like blank.

In the case of a method for producing the stabilizing strut 10, the latter can therefore be formed from a sheet-like blank to give a profile by the strut body 12 being formed to give a profile which is open on one side in the longitudinal direction, and the longitudinal edges 42 and 44 of which are connected integrally to each other at least in some axial sections to give a closed profile, specifically, in the exemplary embodiment shown, by means of the links 46 and 48 which, prior to being joined, are likewise bent in the forming process, in which the U-profile is formed, into the corresponding position according to FIG. 4.

As likewise already mentioned, during the production process the links 46 and 48 are formed onto the sheet-like blank during the punching process, by material being left.

In the case of the two-part design of the stabilizing strut 10 in the longitudinal direction of the strut body 12 with a first profile part 14 and a second profile part 16, the two profile parts 14 and 16, after being completed, are overlapped by their axial end sections 18 and 20, as shown in FIG. 1, and are joined by the plug welds 22, 24 and 26 and the fillet weld 27.

Figure 5:
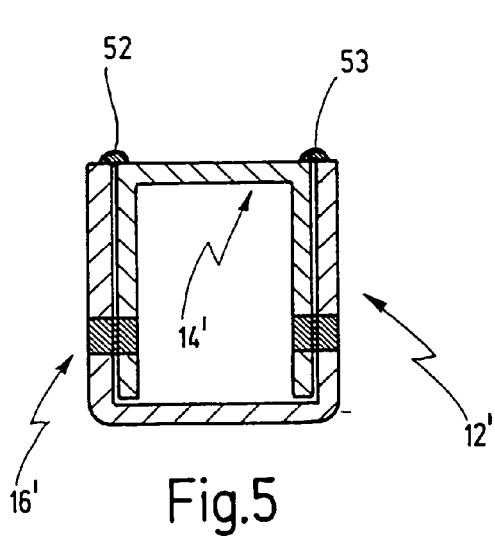
FIG. 5 shows a sectional illustration comparable to FIG. 3, according to an exemplary embodiment modified in comparison with FIG. 1.

While, according to FIG. 3, the profile parts 14 and 16 are joined, with their respective open side pointing in the same direction, to give the strut body 12, in FIG. 5, in an exemplary embodiment modified with respect thereto, the profile part 14' and the profile part 16' are joined with their respective open side pointing in the opposite direction, to give the strut body 12'. In the overlapping region A of the profile parts 14' and 16', a profile, which is closed in some axial sections, of the strut body 12' is therefore produced. Instead of the plug weld 26 on the base side of FIG. 3, the profile parts 14' and 16' are welded to each other via flanged edge welds 52 and 53, and the lateral plug welds 22 and 24 in FIG. 3 are shifted further downward in FIG. 5.

Figure 6:
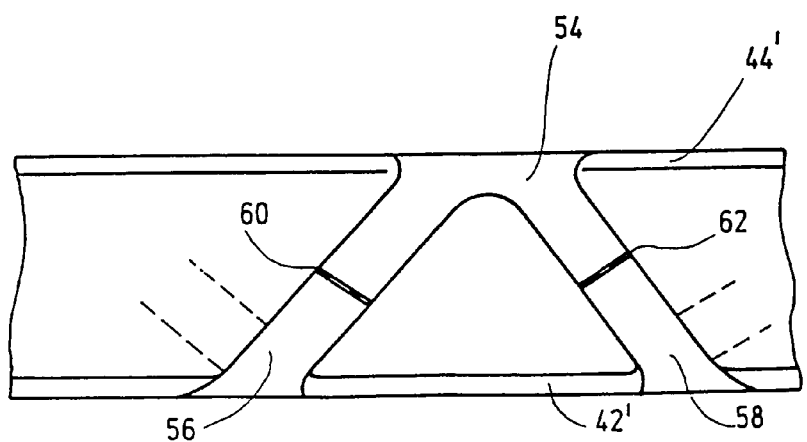
FIG. 6 shows a detail of a stabilizing strut according to a further exemplary embodiment in plan view.
Figure 7:
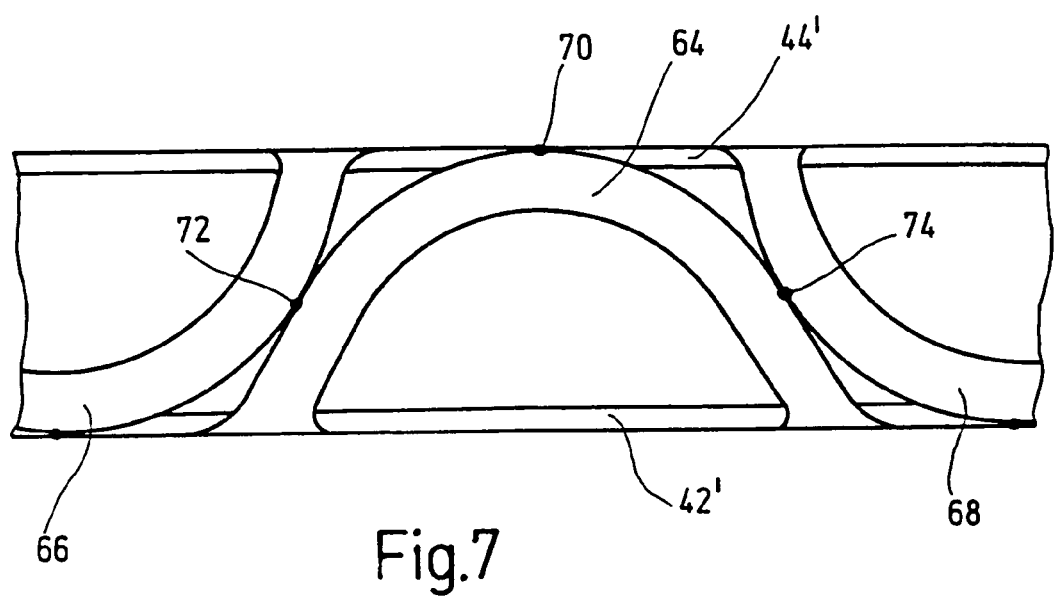
FIG. 7 shows another exemplary embodiment of a stabilizing strut in plan view.

FIGS. 6 and 7 illustrate modifications of the geometrical arrangement and design of the links 46 and 48 in FIGS. 1 to 4.

FIG. 6 illustrates a link arrangement consisting of three links 54, 56 and 58 which together define a V. The link 54 is joined to the links 56 and 58 at welds 60 and 62.

The same V-shaped arrangement may also be obtained if there were only two links which are both formed integrally onto the longitudinal edge 44', point in the manner of a V in opposite directions obliquely to the longitudinal direction of the longitudinal edge 44' and are correspondingly welded to the opposite longitudinal edge 42'. However, the links 56 and 58 may also be designed in the same manner as the link 54, as indicated by broken lines, so that overall a continuous zigzag arrangement of links is produced and a high flexural rigidity is obtained.

FIG. 7 illustrates a link arrangement which is formed from links 64, 66 and 68 of curved design, each of the links 64, 66 and 68, as shown for the link 64, being formed integrally on at two axially spaced-apart points on the same longitudinal edge 42'. On the opposite longitudinal edge 44', the links 64, 66 and 68 are welded by their crowns 70 to the longitudinal edge 44'.

Respectively adjacent links 64 and 66 or 64 and 68 are likewise welded to each other at contact points 72 or 74, respectively.

The preceding exemplary embodiments show that there are diverse possibilities within the context of the invention for the design of a link connection of the longitudinal edges of the profile which is open on one side.

Figure 8:
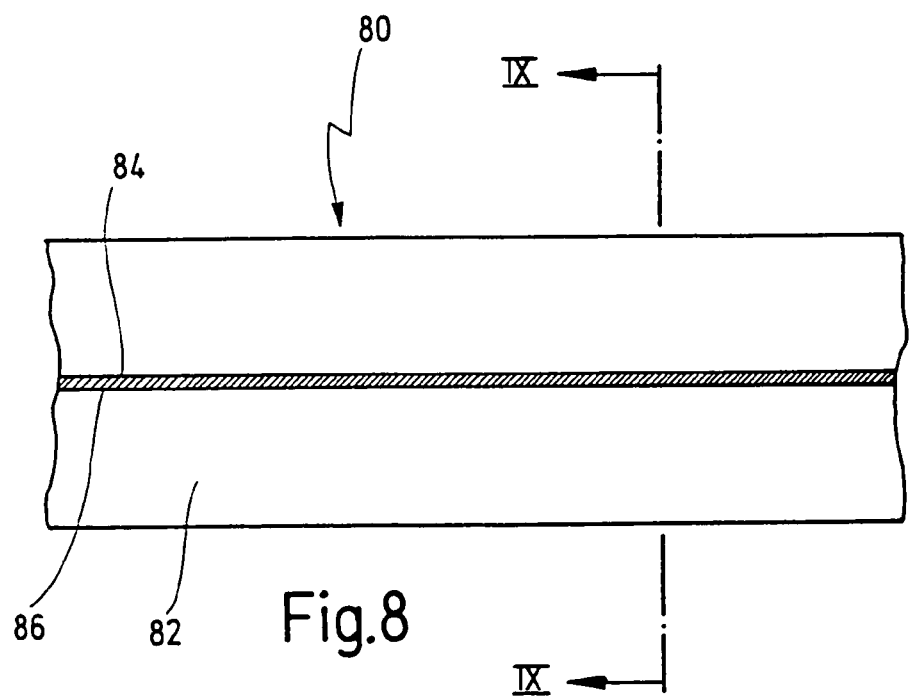
FIG. 8 shows another exemplary embodiment of a stabilizing strut in plan view.
Figure 9:
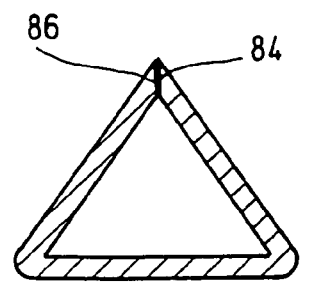
FIG. 9 shows a section along the line IX—IX in FIG. 8.

Finally, FIGS. 8 and 9 illustrate a further exemplary embodiment of a stabilizing strut 80 which differs from the preceding exemplary embodiments by its strut body 82 being formed essentially as a profile which is triangular in cross section and is connected at longitudinal edges 84 and 86 by direct connection of the longitudinal edges 84 and 86.

A profile of this type can likewise be formed from a sheet-like blank by a forming process to give the triangular profile cross section, in which case subsequently the longitudinal edges 84 and 86 are connected to each other at least in some sections by a weld. In this manner, a completely closed box profile is realized which, overall, is integral or is a single part, and can therefore be produced cost-effectively and with a low expenditure on time.

In a modification of this refinement, the profile may, in some sections, also be of U-shaped design in cross section and may be deformed, by direct connection of the longitudinal edges 84 and 86 only in some sections, to give the triangular cross section illustrated.

What is claimed is:

1. A stabilizing strut for a chassis of a vehicle, comprising an elongated strut body having a first end and a second end and being formed into a profile, said profile, in cross section, being open on one longitudinal side at least in some axial sections along a longitudinal direction of said profile, and having, in said some axial sections, two longitudinal edges which are joined to each other, in said some axial sections of said profile, by being connected by means of a plurality of links which extend in part axially in said longitudinal direction of said strut body and are formed integrally onto one of said longitudinal edges and are connected to the other of said two longitudinal edges, to give a partially closed profile in said some axial sections; wherein there are at least two links of said plurality of links which form a V with one another, and further wherein said strut body is formed, at least in some axial sections, essentially as a profile which is triangular in cross section, is initially open at said longitudinal edges and is closed by direct connection of said longitudinal edges.

2. A stabilizing strut for a chassis of a vehicle, comprising an elongated strut body having a first end and a second end and being formed into a profile, said profile, in cross section, being open on one longitudinal side at least in some axial sections along a longitudinal direction of said profile, and having, in said some axial sections, two longitudinal edges which are joined to each other, in said some axial sections of said profile, by being connected by means of a plurality of links which extend in part axially in said longitudinal direction of said strut body and are formed integrally onto one of said longitudinal edges and are connected to the other of said two longitudinal edges, to give a partially closed profile in said some axial sections; wherein said strut body is joined in said longitudinal direction from at least two profile parts which are arranged partially overlapping one another in said longitudinal direction, and further wherein said profile parts are joined, with their respective opening side pointing in opposite directions.

3. The stabilizing strut of claim 2, wherein at least one link of said plurality of links is of curved design, said at least one link being formed at two axially spaced-apart points on the same one of said two longitudinal edges of said strut body.

4. A stabilizing strut for a chassis of a vehicle, comprising an elongated strut body having a first end and a second end and being formed into a profile, said profile, in cross section, being open on one longitudinal side at least in some axial sections along a longitudinal direction of said profile, and having, in said at least some axial sections, two longitudinal edges which are joined to each other in said at least some axial sections of said profile by being connected by means of a plurality of links which extend in part axially in said longitudinal direction of said strut body, at least one link of said plurality of links being formed integrally onto one of said longitudinal edges, and at least a second link of said plurality of links being connected to the other of said longitudinal edges, said at least one link and said at least second link being connected to each other at a contact point between and spaced from said two longitudinal edges.

5. A stabilizing strut for a chassis of a vehicle, comprising an elongated strut body having a first end and a second end and being formed into a profile, said profile, in cross section, being open on one longitudinal side at least in some axial sections along a longitudinal direction of said profile, and having, in said at least some axial sections, two longitudinal edges which are joined to each other in said at least some axial sections of said profile by being connected by means of a plurality of links which extend in part axially in said longitudinal direction of said strut body, at least one link of said plurality of links being formed integrally onto one of said longitudinal edges, and at least a second link of said plurality of links being connected to the other of said longitudinal edges, said at least one link and said at least second link being connected to each other at a contact point between said two longitudinal edges; wherein at least two links of said plurality of links form a V with one another.

6. The stabilizing strut of claim 5, wherein at least one link of said plurality of links is of curved design, said at least one link being formed at two axially spaced-apart points on the same one of said two longitudinal edges of said strut body.

7. A stabilizing strut for a chassis of a vehicle, comprising an elongated strut body having a first end and a second end and being formed into a profile, said profile, in cross section, being open on one longitudinal side at least in some axial sections along a longitudinal direction of said profile, and having in some axial sections two longitudinal edges which are joined to each other in said some axial sections of said profile by being connected by means of at least one link which extends in part axially in said longitudinal direction of said strut body and is formed integrally onto at least one of said longitudinal edges and is connected to the other of said two longitudinal edges; and wherein said at least one link is of curved design, said link being formed at two axially spaced-apart points on the same one of said two longitudinal edges of said strut body.

8. The stabilizing strut of claim 7 wherein said elongated strut body is formed from a sheet-like blank.

9. A stabilizing strut for a chassis of a vehicle, comprising an elongated strut body having a first end and a second end and being formed into a profile, said profile, in cross section, being open on one longitudinal side at least in some axial sections along a longitudinal direction of said profile, and having in some axial sections two longitudinal edges which are joined to each other in said some axial sections of said profile by being connected by means of at least one link which extends in part axially in said longitudinal direction of said strut body and is formed integrally onto at least one of said longitudinal edges and is connected to the other of said two longitudinal edges; and wherein said strut body is joined in said longitudinal direction from at least two profile parts which are arranged partially overlapping one, another in said longitudinal direction, and further wherein said profile parts are joined, with their respective opening side pointing in opposite directions.

10. The stabilizing strut of claim 9 wherein said elongated strut body is formed from a sheet-like blank.

\* \* \* \* \*